US010956651B1

(12) United States Patent
Leem

(10) Patent No.: US 10,956,651 B1
(45) Date of Patent: Mar. 23, 2021

(54) DATA TABLE DISPLAY ADJUSTMENT

(71) Applicant: INTERNATIONAL BUSINESS MACHINES CORPORATION, Armonk, NY (US)

(72) Inventor: Yojin Leem, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/575,581

(22) Filed: Sep. 19, 2019

(51) Int. Cl.
*G06F 17/20* (2006.01)
*G06F 40/103* (2020.01)
*G06F 3/0484* (2013.01)
*G06F 40/177* (2020.01)

(52) U.S. Cl.
CPC ........ *G06F 40/103* (2020.01); *G06F 3/04842* (2013.01); *G06F 40/177* (2020.01)

(58) Field of Classification Search
CPC ...... G06F 40/103; G06F 40/177; G06F 40/18; G06F 3/04842
See application file for complete search history.

(56) References Cited

U.S. PATENT DOCUMENTS

| 5,632,009 | A | * | 5/1997 | Rao | G06T 11/206 715/201 |
| 5,835,917 | A | * | 11/1998 | Shin | G06F 40/177 715/209 |
| 5,970,506 | A | * | 10/1999 | Kiyan | G06F 40/18 715/212 |
| 6,313,848 | B1 | * | 11/2001 | Hoag | G06F 40/18 345/684 |
| 9,400,776 | B1 | | 7/2016 | Kennedy, Jr. | |
| 10,282,406 | B2 | | 5/2019 | Bissantz | |
| 2001/0021936 | A1 | * | 9/2001 | Bertram | H04L 41/22 715/245 |
| 2003/0188259 | A1 | * | 10/2003 | Aureglia | G06F 40/18 715/214 |

(Continued)

OTHER PUBLICATIONS

Mell et al., "The NIST Definition of Cloud Computing", National Institute of Standards and Technology, Special Publication 800-145, Sep. 2011, 7 pages.

(Continued)

*Primary Examiner* — Shahid K Khan
(74) *Attorney, Agent, or Firm* — Steven M. Bouknight

(57) ABSTRACT

An embodiment of the invention may include a method, computer program product and computer system for data table display adjustment which may include a computing device. The computing device may receive a user selection of a data file, which may contain a data table having one or more rows, a left-most column, a right-most column, and a plurality of middle columns with each column having a width, for display via a user interface. The computing device may render an interactive switch for enabling data table display adjustment on the user interface. The computing device may receive user input via the interactive switch and render the right-most column and the left-most column static at outer ends of the user interface and collapse the plurality of middle columns, to fit within a remaining available width of the user interface between the right-most column and the left-most column of the data table.

19 Claims, 9 Drawing Sheets

(56) References Cited

U.S. PATENT DOCUMENTS

| | | | |
|---|---|---|---|
| 2004/0075672 A1* | 4/2004 | Vale | G09G 5/00 |
| | | | 345/660 |
| 2006/0117253 A1* | 6/2006 | Polash | G06F 40/103 |
| | | | 715/247 |
| 2006/0150078 A1* | 7/2006 | Brookler | G06F 40/103 |
| | | | 715/228 |
| 2006/0174189 A1* | 8/2006 | Weitzman | G06F 40/18 |
| | | | 715/209 |
| 2010/0269031 A1* | 10/2010 | Buczek | G06F 40/18 |
| | | | 715/217 |
| 2015/0089340 A1 | 3/2015 | Logan | |
| 2015/0347370 A1 | 12/2015 | Villani | |

OTHER PUBLICATIONS

Screen capture from CodePen entitled "Horizontal scrolling table with Fixed first column", 1 page, a pen by Paul D'Brien, Accessed on Jul. 12, 2019, Retrieved from Internet: <URL: https://codepen.io/paulobrien/pen/gWoVzN>.

Stack Overflow, (A forum for www.stackoverflow.com)[online], "Scrollable table with fixed columns and header, with modem CSS", Accessed on Jul. 12, 2019, 5 pages, Retrieved from Internet: <URL: https://stackoverflow.com/questions/46275555/scrollable-table-with-fixed-columns-and-header-with-modern-css>.

Screen capture from Dribble entitled "Data Grid", 3 pages, a pen by Virgil Pana, Accessed on Sep. 17, 2019, Retrieved from Internet: <https://dribbble.com/shots/1903644-Data-Grid>.

\* cited by examiner

DATA TABLE DISPLAY ADJUSTMENT

BACKGROUND

The present invention relates generally to a method, system, and computer program for data table display adjustment. More particularly, the present invention relates to a method, system, and computer program for shuffling table columns in limited horizontal space.

BRIEF SUMMARY

An embodiment of the invention may include a method, computer program product and computer system for data table display adjustment. The method, computer program product and computer system may include a computing device which may receive a user selection of a data file for display via a user interface. The data file may contain a data table having one or more rows, a left-most column, a right-most column, and a plurality of middle columns with each column having a width. The computing device may render an interactive switch for enabling data table display adjustment on the user interface. The computing device may receive user input via the interactive switch enabling data table display adjustment and render the right-most column and the left-most column of the data table static at outer ends of the user interface and collapse the plurality of middle columns to fit within a remaining available width of the user interface between the right-most column and the left-most column of the data table.

In embodiments of the invention, the computing device may receive a user selection of one of the plurality of collapsed middle columns and display the selected middle column in its entire width and further collapse the remaining middle columns to fit the remaining width of the user interface between the right-most column and the left-most column of the data table.

BRIEF DESCRIPTION OF THE DRAWINGS

FIG. 1b illustrates example operating modules of the data table display adjustment program of FIG. 1a.

FIG. 1c illustrates an example user interface of the data table display adjustment program of FIG. 1a.

FIG. 1d illustrates an example user interface of the data table display adjustment program of FIG. 1a.

FIG. 1e illustrates an example user interface of the data table display adjustment program of FIG. 1a.

FIG. 1f illustrates an example user interface of the data table display adjustment program of FIG. 1a.

FIG. 1g illustrates an example user interface of the data table display adjustment program of FIG. 1a.

FIG. 1h illustrates an example user interface of the data table display adjustment program of FIG. 1a.

DETAILED DESCRIPTION

Figure 1A:
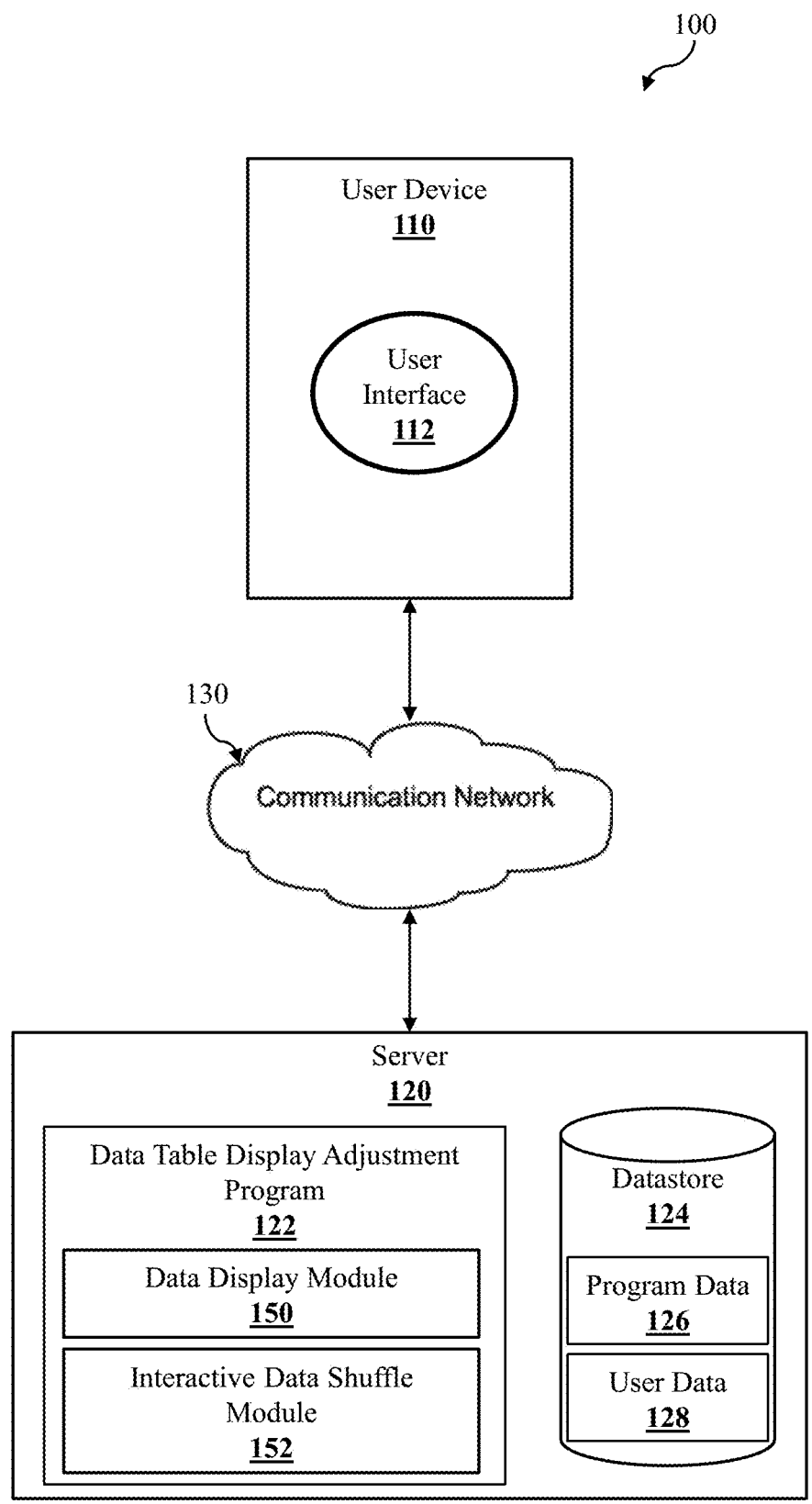
FIG. 1a illustrates a system for data table display adjustment, in accordance with an embodiment of the invention.
Figure 1B:
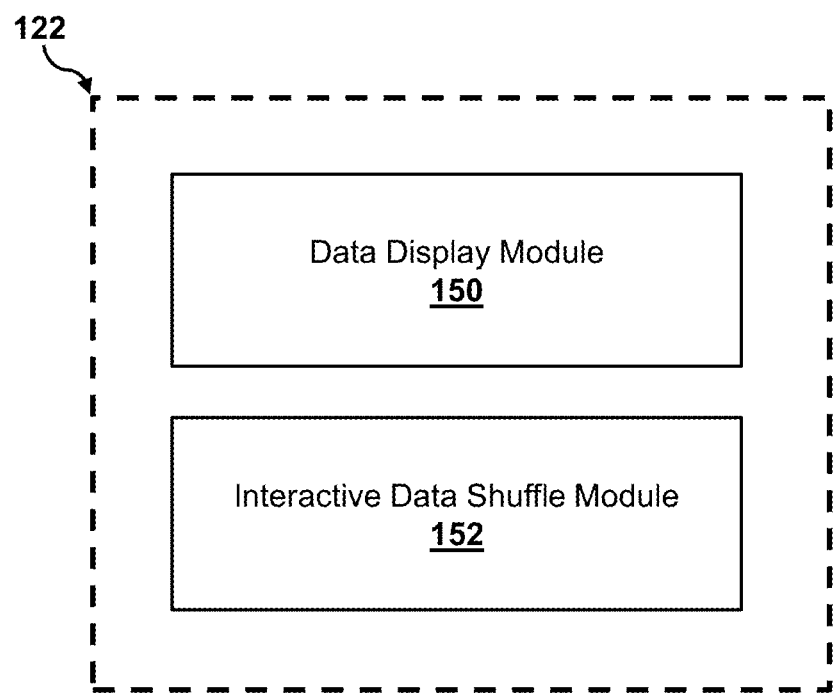

Embodiments of the present invention will now be described in detail with reference to the accompanying Figures.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention provide a method, computer program, and computer system for data table display adjustment and in particular shuffling table columns in a limited horizontal space. Current technology and existing software allow for the display of numerous data table columns that may go beyond the viewable area of a display. One current solution for viewing the data columns outside the viewable area of the display includes providing a horizontal scroll bar. A horizontal scroll bar makes it hard to know how many data columns there are in a given data table as they are not all visible to the user. Another current solution is enabling the user to turn off certain data columns or enabling users to manually adjust the widths of data columns. However, these solutions mean certain data columns may no longer be visible at all or the data columns may be truncated such that the data is barely visible if visible at all. Thus, current technology makes it hard for a user to view an entire data table when the data table contains a number of data columns that exceeds the viewable area of the display being used by the user. Embodiments of the present invention improve display technology by providing an interactive switch which enables the shuffling or collapsing of the data columns such that all the data columns are viewable to the user without requiring the user to horizontally scroll. Further, embodiments of the present invention allow for the shuffling or collapsing of the data columns such the widths of the data columns do not need to be truncated or manually adjusted in order for all the data columns to be viewable without horizontal scrolling unless the user desires.

Reference will now be made in detail to the embodiments of the present invention, examples of which are illustrated in the accompanying drawings, wherein like reference numerals refer to like elements throughout. Embodiments of the invention are generally directed to a system for data table display adjustment.

FIG. 1 illustrates a data table display adjustment system 100, in accordance with an embodiment of the invention. In an example embodiment, the data table display adjustment system 100 includes a user device 110, and a server 120, interconnected via a network 130.

In the example embodiment, the network 130 is the Internet, representing a worldwide collection of networks and gateways to support communications between devices connected to the Internet. The network 130 may include, for example, wired, wireless or fiber optic connections. In other embodiments, the network 130 may be implemented as an intranet, a local area network (LAN), a wide area network (WAN), or a wired or wireless personal area network (PAN). In general, the network 130 can be any combination of connections and protocols that will support communications between the user device 110 and the server 120.

The user device 110 may include a user interface 112. In the example embodiment, the user device 110 may be a desktop computer, a notebook, a laptop computer, a tablet computer, a thin client, or any other electronic device or computing system capable of storing, compiling, organizing and displaying audio, visual, or textual content and receiving and sending that content to and from other computing devices, such as the server 120 via the network 130. While only a single user device 110 is depicted, it can be appreciated that any number of user devices may be part of the data table display adjustment system 100. In some embodiments, the user device 110 includes a collection of devices or data sources. While the user device 110 is depicted as separate from the server 120, it can be appreciated that the user device 110 and the server 120 may be the same device. The user device 110 is described in more detail with reference to FIG. 3.

The user interface 112 includes components used to receive input from a user on the user device 110 and transmit the input to the table display adjustment program 122 residing on the server 120, or conversely to receive information from the table display adjustment program 122 and display the information to the user on the user device 110. In an example embodiment, the user interface 112 uses a combination of technologies and devices, such as device drivers, to provide a platform to enable users of the user device 110 to interact with the table display adjustment program 122. In the example embodiment, the user interface 112 receives input, such as but not limited to, textual, visual, or audio input received from a physical input device, such as but not limited to, a keypad, mouse, and/or a microphone. Example embodiments of the user interface 112 are illustrated in FIGS. 1c-1h and will be described in further detail below with reference to FIGS. 1b-1h.

The server 120 includes table display adjustment program 122 and datastore 124. In the example embodiment, the server 120 may be a desktop computer, a notebook, a laptop computer, a tablet computer, a thin client, or any other electronic device or computing system capable of storing, compiling, organizing, and displaying audio, visual, and/or textual data and receiving and sending that data to and from other computing devices, such as the user device 110 via network 130. While the server 120 is depicted as separate from the user device 110, it can be appreciated that the server 120 and the user device 110 may be the same device. The server 120 is described in more detail with reference to FIG. 3.

The program datastore 124 may store the program data 126 and the user data 128. The program data 126 may include, but is not limited to data stored, compiled, and/or organized by the table display adjustment program 122 and/or data created by the table display adjustment program 122 such as, but not limited to, data tables. The user data 128 may include, but is not limited to, user data files, user identification data, user preferences, user account data, and/or user history, etc. associated with one or more users of the table display adjustment program 122. In various embodiments, all or part of the program datastore 124 may be installed and run on the server 120. The datastore 124 is described in more detail above and with reference to FIG. 3.

The table display adjustment program 122 is a program capable of shuffling data table columns in a limited horizontal space. The table adjustment program 122 provides an interactive switch to enable the shuffling of table columns in a limited horizontal space. The table display adjustment program 122 includes the data display module 150, and the interactive data shuffle module 152. In embodiments of the invention, the table display adjustment program 122 may be a stand-alone computer program or it may be deployed as a tool within another program. In various embodiments, all or part of the table display adjustment program 122 may be installed and run on the user device 120.

Figure 1C:
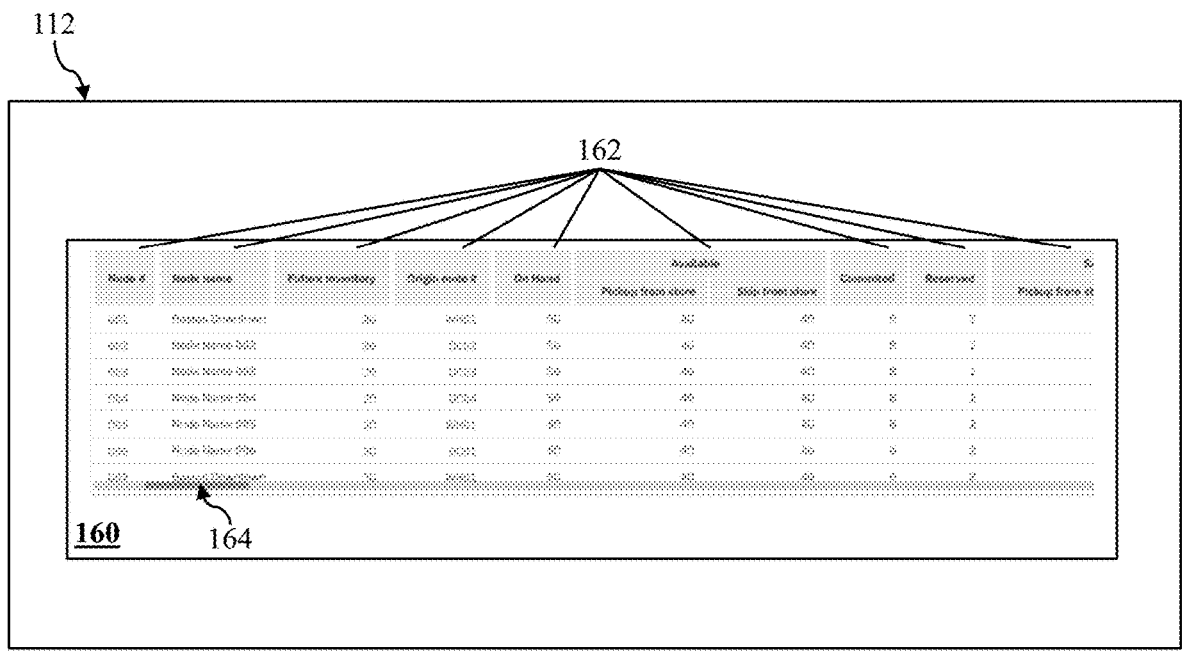

The data display module 150 enables a user to select a data file stored in the user data 128 or in the program data 126 for display on the user device 110 via the user interface 112. In an example embodiment, the data file is a data table such as, but not limited to, a Microsoft Excel® Spreadsheet, a Google Docs spreadsheet, an Apache Openoffice spreadsheet, or an Apple Numbers spreadsheet, etc. For example, the data table may have, but is not limited to, at least one row of data and a plurality of columns of data including a right-most column, a left-most column, and a plurality of middle columns. The columns of data in the data table may have associated column headers. Further, the columns of data and the associated column headers in the data table have a width, which may vary in size and may be adjustable. The total width of the columns of the data table may exceed the viewable area on the user interface 112 requiring a user to scroll horizontally to view all the columns of the data table. Referring to FIG. 1c, an example user interface 112 displaying a data table 160 is illustrated. The data table of FIG. 1c has a plurality of columns 162 with associated column headers, which have a total width exceeding the viewable area of the user interface 112; thus, a horizontal scroll bar 164 is displayed to allow the user to scroll horizontally to view all the columns 162.

Figure 1D:
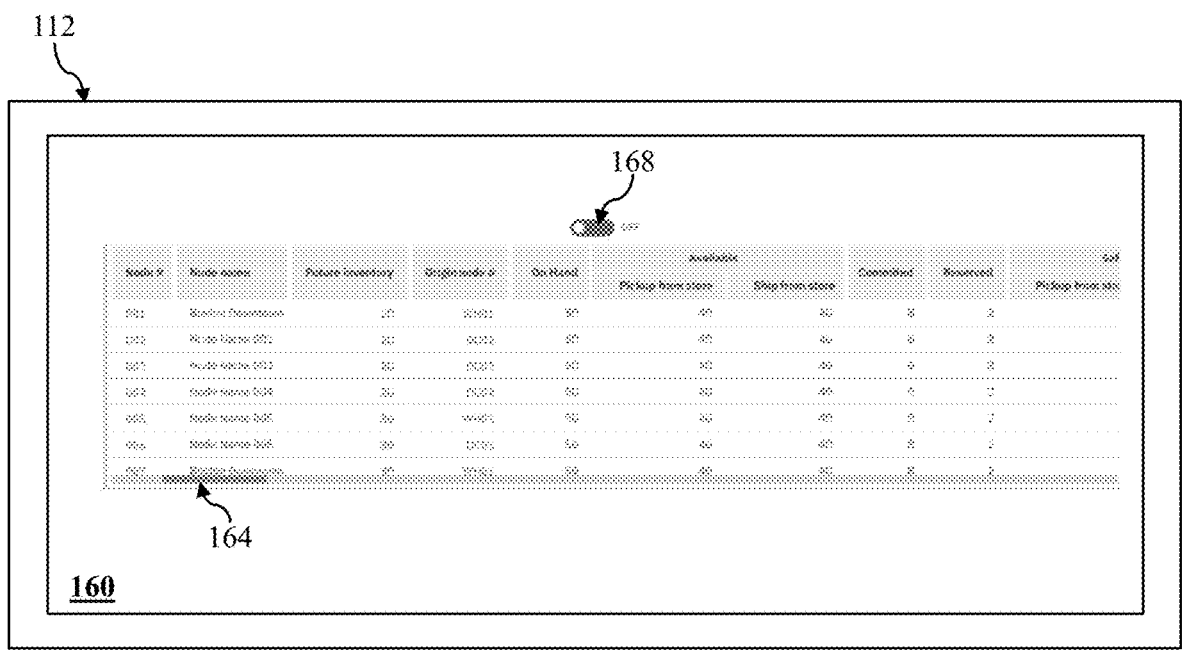

The interactive data shuffle module 152 renders an interactive switch 168 on the user interface 112 to enable data table display adjustment. In an embodiment of the invention, the interactive data shuffle module 152 may automatically render the interactive switch 168 on the user interface 112 in response to the interactive data shuffle module 152 determining that the total width of the columns 162 exceeds the width of the viewable area of the user interface 112. In another embodiment of invention, the interactive switch 168 may be permanently rendered on the user interface 112. If the interactive switch 168 is permanently rendered on the user interface 112, the interactive switch 168 may be disabled if the total width of the columns 162 does not exceed the viewable area of the user interface 112. For example, the interactive switch may be, but is not limited to, grayed out, and/or un-clickable, etc. The interactive switch 168 may be rendered, for example, but not limited to, outside of the data table on the user interface 112 or within the data table display. The interactive switch 168 may be, but it not limited to, an interactive toggle switch, a button, a selectable menu, etc. An example interactive switch 168 is illustrated in FIG. 1d as an on/off toggle switch.

Figures 1E, 1F:
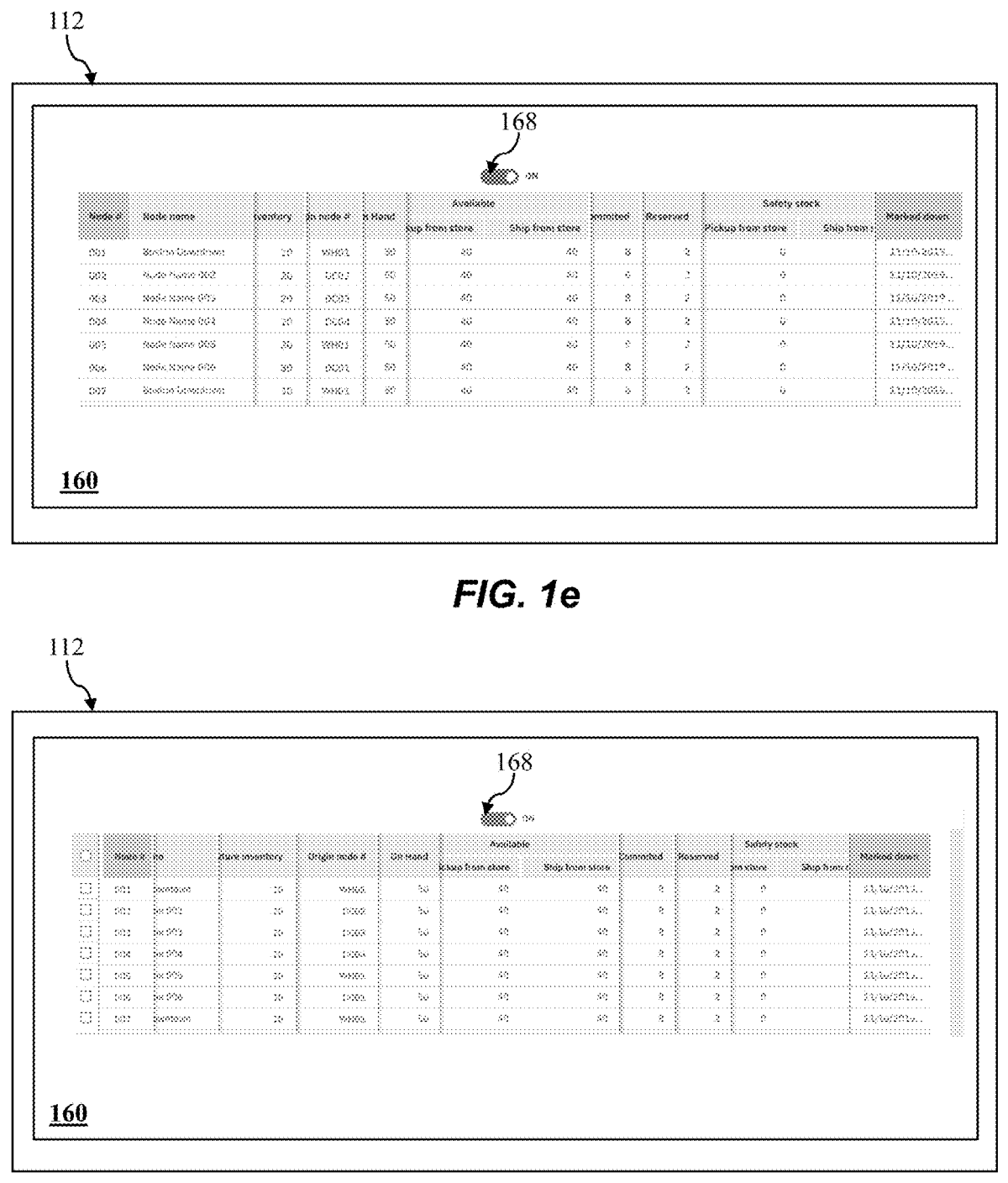

The interactive data shuffle module 152 receives user input via the interactive switch 168. The user input may include, but is not limited to, switching the interactive switch 168 to the "on" position to enable data table display adjustment. The interactive data shuffle module 152, in response to receiving the user input via the interactive switch 168, renders the right-most column and the left-most column of the data table 160 static at the outer ends of the viewable area of the user interface 112. The right-most column and the left-most column may be rendered static such that all the data displayed in those columns are displayed or such that only a portion of the data displayed in those columns is displayed. Further, the right-most column and the left-most column may be rendered static such that the widths of the right-most column and the left-most column stays constant. A user may adjust the width of the static left-most column and right-most column to a desired width. As illustrated in FIG. 1e, the left-most column, titled "Node #," has been rendered static such that all the data displayed in the left-most column is displayed while the right-most column, titled "Marked down," has been rendered static such that only a portion the data displayed in the right-most column is displayed.

Further, the interactive data shuffle module 152, in response to receiving the user input via the interactive switch 168, collapses the plurality of middle columns of the data table 160 to fit the remaining available width of the user interface 112 between the right-most column and the left most column. The plurality of middle columns may be collapsed by, for example, but not limited to, shifting the plurality of middle columns toward the center point of the interface 112 as illustrated in FIG. 1e, shifting the plurality of middle columns towards the right-most column, or shifting the plurality of middle columns towards the left-most column as illustrated in FIG. 1f. The interactive data shuffle module 152 may collapse the plurality of middle columns by partially hiding a portion of each of the plurality of middle columns by a portion of an adjacent middle column as illustrated in FIGS. 1e-1f. Rendering the right-most column and the left-most column of the data table 160 static and collapsing the plurality of middle columns of the data table 160 eliminates the need for horizontal scrolling within the user interface 112; thus, eliminating the need for the horizontal scroll bar 164 as illustrated in FIGS. 1e-1f.

Figure 1G:
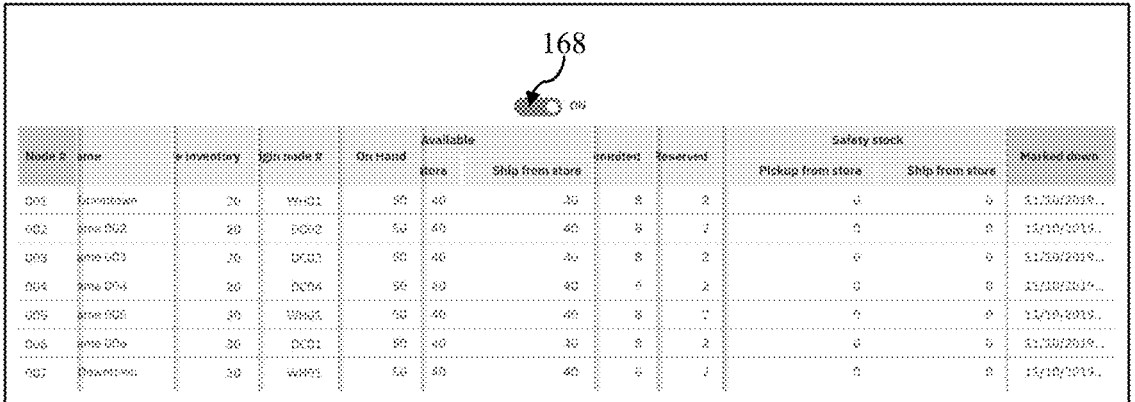
Figure 1H:
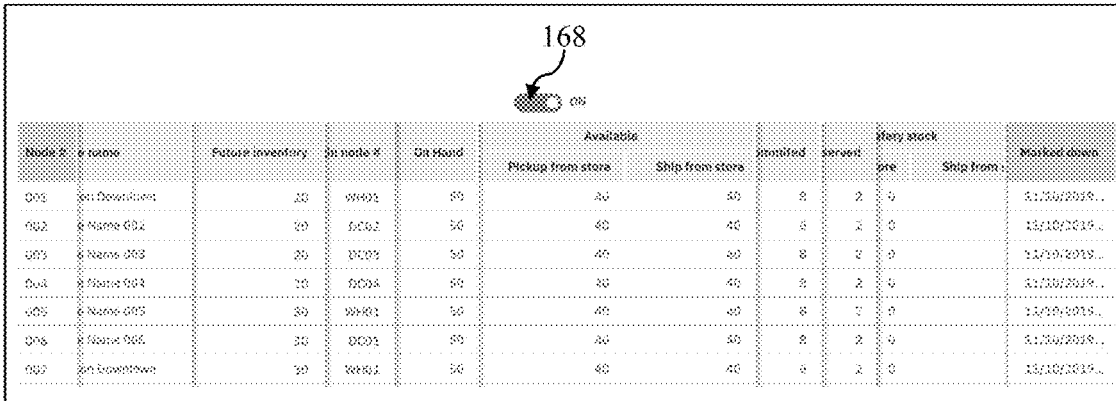

The interactive data shuffle module 152 may receive a user selection of one or more of the plurality of collapsed middle columns on the user interface 112. The interactive data shuffle module 152, in response to receiving a user selection of a collapsed middle column may display the selected middle column in its entire width such that all data contained within the selected middle column is displayed on the user interface 112. The interactive data shuffle module 152 may further collapse the remaining middle columns to fit the remaining width of the viewable area of the user interface 112 as discussed above. The remaining middle columns may be further collapsed such that the remaining middle columns all have the same width. As illustrated in FIG. 1g, a user has selected the "Safety stock" column and the interactive data shuffle module 152 has further shifted, i.e. collapsed, the other middle columns further towards the left-most "Node #" column. As illustrated in FIG. 1h, a user has selected the "Available" column and the interactive data shuffle module 152 has further shifted, i.e. collapsed, the middle columns to the left of the "Available" column further towards the left-most "Node #" column, and the middle columns to the right of the "Available" column further towards the right-most "Marked down" column. While selection of a single middle column is illustrated, it can be appreciated that the user may select more than one middle column to simultaneously view in its entirety; however, the user will be restricted to simultaneously viewing the number of middle columns that may be viewed in the viewable area of the user interface 112. In another embodiment of the invention, the interactive data shuffle module 152 may receive a user adjustment of the displayed width of one or more of the plurality middle columns and further shift, i.e. collapse, the remaining middle columns as discussed above.

Figure 2:
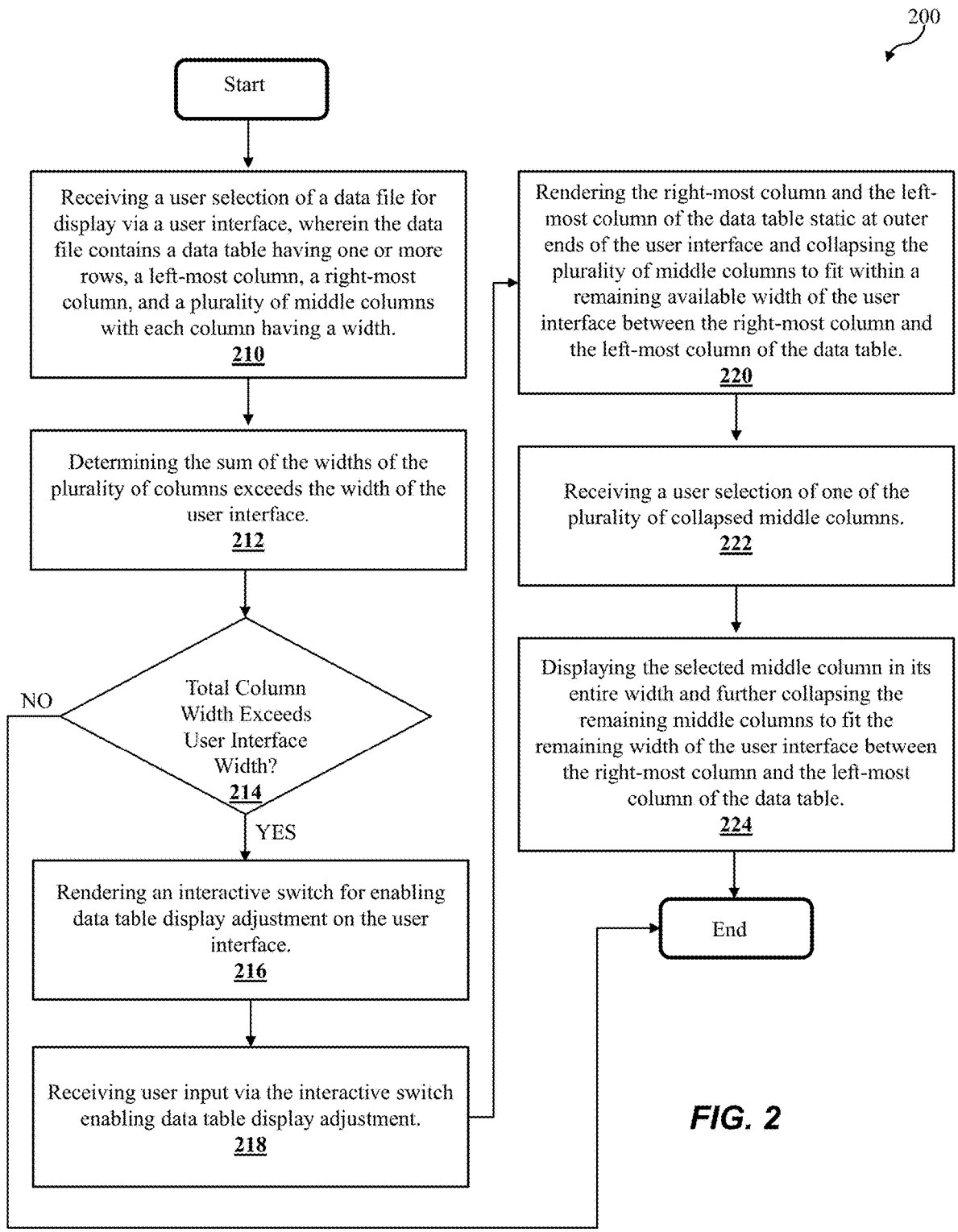
FIG. 2 is a flowchart illustrating an example method of data table display adjustment in accordance with an embodiment of the invention.

Referring to FIG. 2, a method 200 for table display adjustment is depicted, in accordance with an embodiment of the present invention.

Referring to block 210, the data display module 150 receives a user selection of a data file for display via the user interface 112. The data file may be a data table having one or more rows, a left-most column, a right-most column, and a plurality of middle columns with each column having a width. Data file selection is described in more detail above with reference to the data display module 150.

Referring to block 212, the interactive data shuffle module 152 determines if the sum of the widths of the plurality of columns of the data table exceeds the width of the user interface. If the interactive data shuffle module 152 determines the width of plurality of columns of the data table exceeds the width of the user interface at block 214, the table display adjustment program 122 proceeds to block 216. If the interactive data shuffle module 152 determines the width of plurality of columns of the data table does not exceed the width of the user interface at block 214, the table display adjustment program 122 terminates. Data table column width determination is described in more detail above with reference to the interactive data shuffle module 152.

Referring to block 216, the interactive data shuffle module 152 renders an interactive switch 168 for enabling data table display adjustment on the user interface 112. Interactive switch rendering is described in more detail above with reference to the interactive data shuffle module 152.

Referring to block 218, the interactive data shuffle module 152 receives user input via the interactive switch 168 enabling data table display adjustment. User input via the interactive switch 168 is described in more detail above with reference to the interactive data shuffle module 152.

Referring to block 220, the interactive data shuffle module 152 renders the right-most column and the left-most column of the data table static at outer ends of the user interface 112 and collapses the plurality of middle columns to fit the remaining available width of the user interface 112 between the right-most column and the left-most column of the data table. Data table column rendering is described in more detail above with reference to the interactive data shuffle module 152.

Referring to block 222, the interactive data shuffle module 152 receives a user selection of one of the plurality of collapsed middle columns. User columns selection is described in more detail above with reference to the interactive data shuffle module 152.

Referring to block 224, the interactive data shuffle module 152 displays the selected middle column in its entire width and further collapses the remaining middle columns to fit the remaining width of the user interface 112 between the right-most column and the left-most column of the data table. Data table column selection and data table display adjustment is described in more detail above with reference to the interactive data shuffle module 152.

Figure 3:
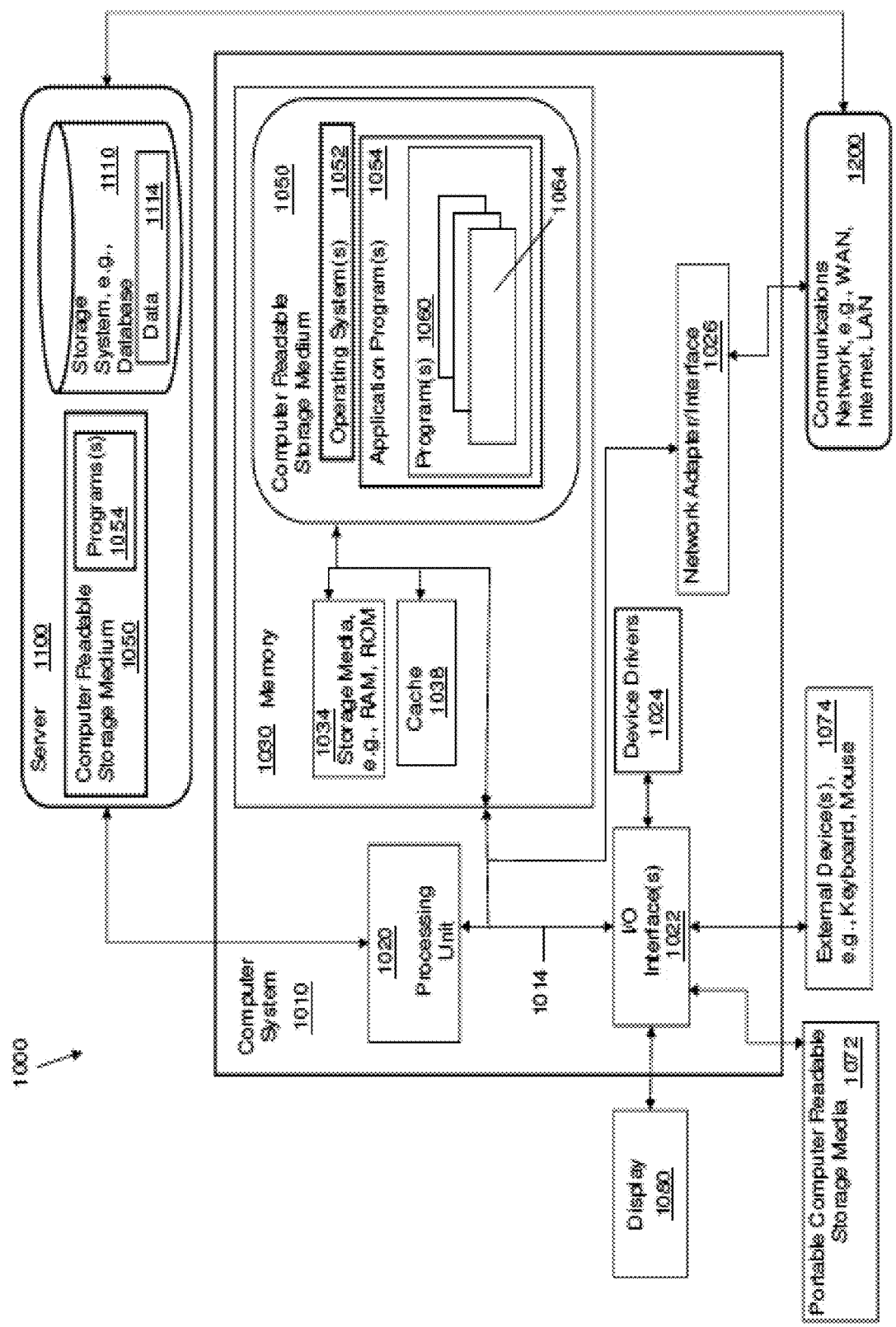
FIG. 3 is a block diagram depicting the hardware components of the data table display adjustment system of FIG. 1, in accordance with an embodiment of the invention.

Referring to FIG. 3, a system 1000 includes a computer system or computer 1010 shown in the form of a generic computing device. The method 200 for example, may be embodied in a program(s) 1060 (FIG. 3) embodied on a computer readable storage device, for example, generally referred to as memory 1030 and more specifically, computer readable storage medium 1050 as shown in FIG. 3. For example, memory 1030 can include storage media 1034 such as RAM (Random Access Memory) or ROM (Read Only Memory), and cache memory 1038. The program 1060 is executable by the processing unit or processor 1020 of the computer system 1010 (to execute program steps, code, or program code). Additional data storage may also be embodied as a database 1110 which can include data 1114. The computer system 1010 and the program 1060 shown in FIG. 3 are generic representations of a computer and program that may be local to a user, or provided as a remote service (for example, as a cloud based service), and may be provided in further examples, using a web site accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in FIG. 3 as program modules 1064. The program 1060 and program modules 1064 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

More specifically, as shown in FIG. 3, the system 1000 includes the computer system 1010 shown in the form of a general-purpose computing device with illustrative periphery devices. The components of the computer system 1010 may include, but are not limited to, one or more processors or processing units 1020, a system memory 1030, and a bus 1014 that couples various system components including system memory 1030 to processor 1020.

The bus 1014 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 1010 can include a variety of computer readable media. Such media may be any available media that is accessible by the computer 1010 (e.g., computer system, or server), and can include both volatile and non-volatile media, as well as, removable and non-removable media. Computer memory 1030 can include additional computer readable media 1034 in the form of volatile memory, such as random access memory (RAM), and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The methods 200 (FIG. 2), for example, may be embodied in one or more computer programs, generically referred to as a program(s) 1060 and can be stored in memory 1030 in the computer readable storage medium 1050. The program 1060 can include program modules 1064. The program modules 1064 can generally carry out functions and/or methodologies of embodiments of the invention as described herein. For example, the program modules 1064 can include the modules 150-152 described above with reference to FIG. 1b. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, microwave transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
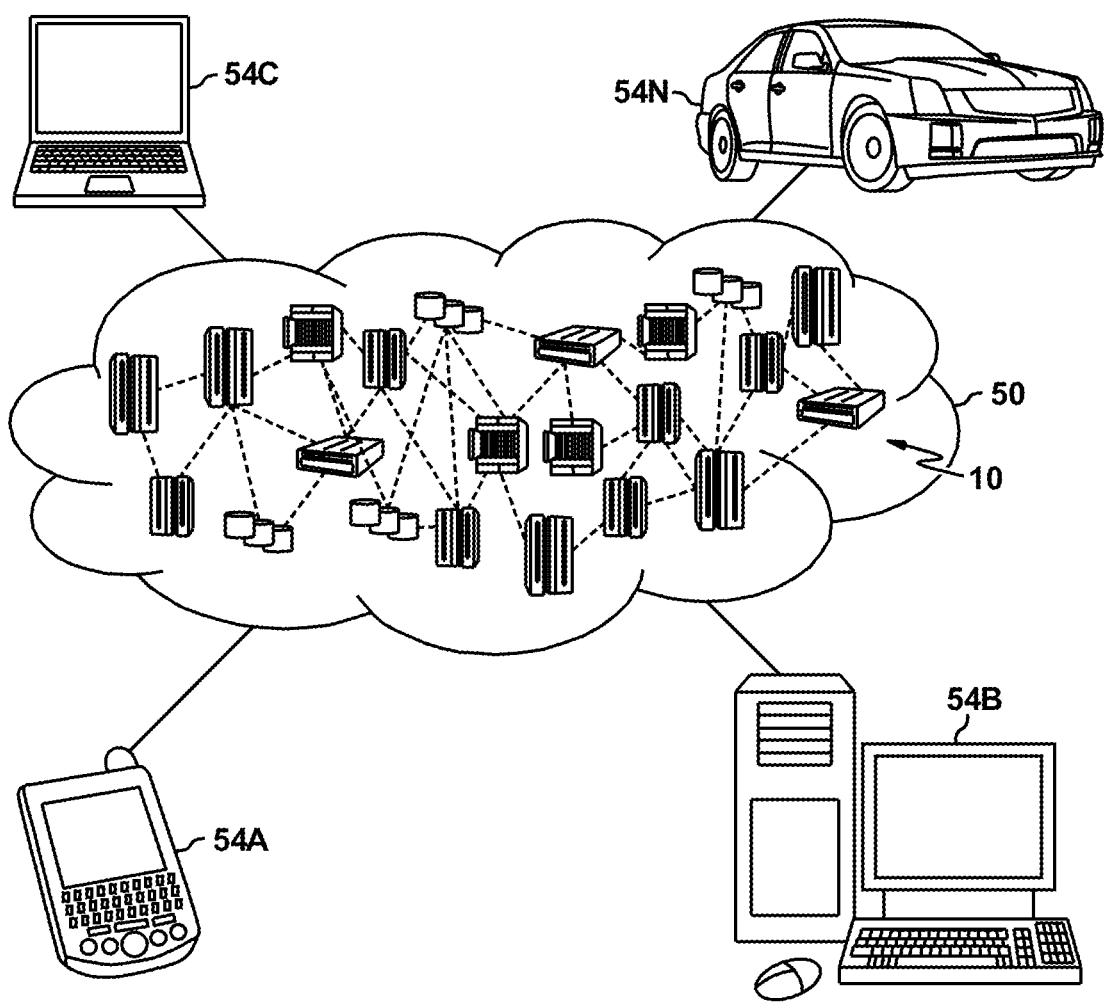
FIG. 4 illustrates a cloud computing environment, in accordance with an embodiment of the invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
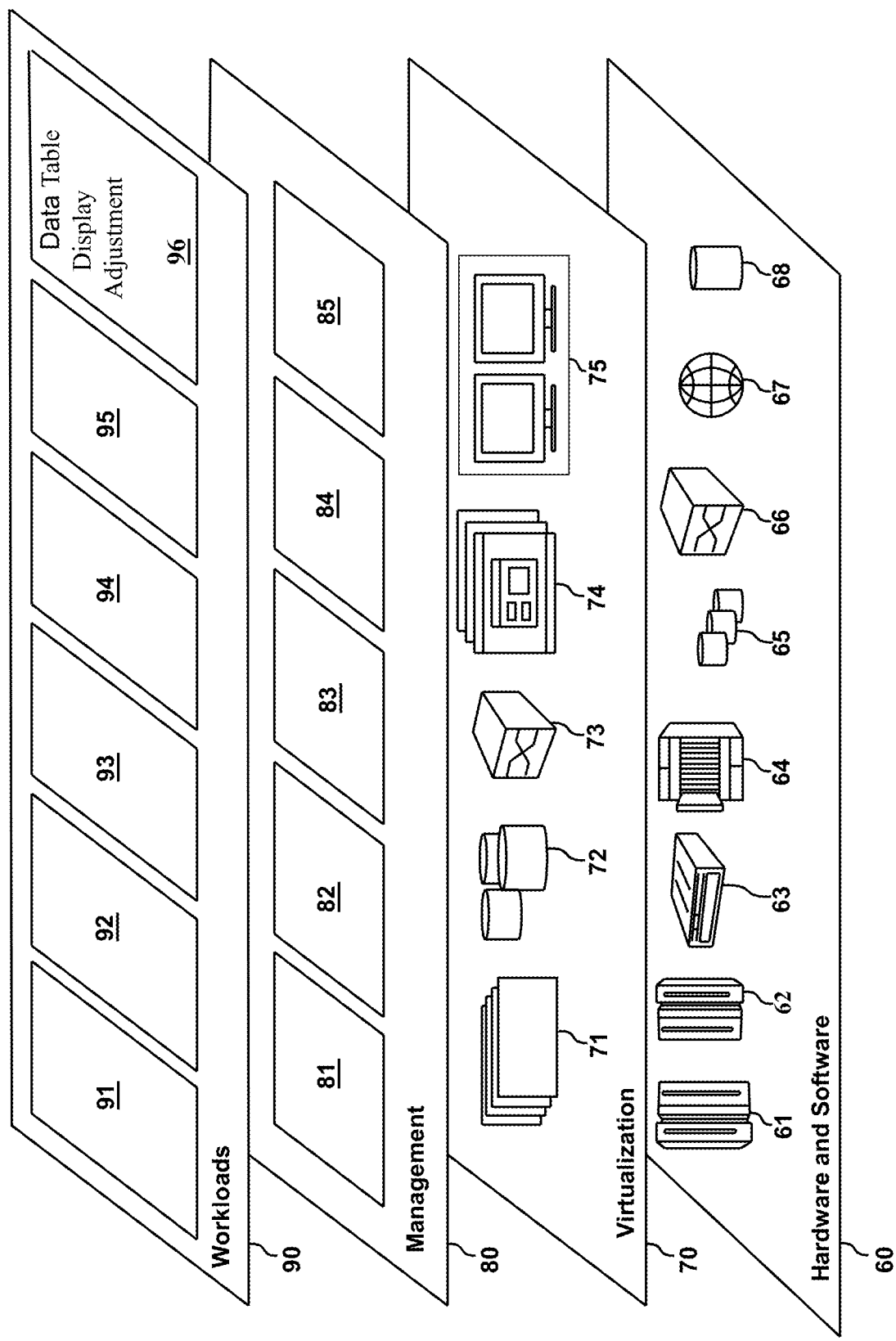
FIG. 5 illustrates a set of functional abstraction layers provided by the cloud computing environment of FIG. 4, in accordance with an embodiment of the invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data table display adjustment 96.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

What is claimed is:

1. A method for data table display adjustment, the method comprising:
   receiving, by a computing device, a user selection of a data file for display via a user interface, wherein the data file contains a data table having one or more rows, a left-most column, a right-most column, and a plurality of middle columns with each column having a width;
   rendering, by the computing device, an interactive switch for enabling data table display adjustment on the user interface;
   receiving, by the computing device, user input via the interactive switch enabling data table display adjustment; and
   rendering, by the computing device, the right-most column and the left-most column of the data table static at outer ends of the user interface and collapsing the plurality of middle columns to fit within a remaining available width of the user interface between the right-most column and the left-most column of the data table, wherein collapsing the plurality of middle columns comprises shuffling and shifting the plurality of middle columns such that a portion of each of the plurality of middle columns is hidden by a portion of an adjacent middle column.

2. The method as in claim 1, further comprising:
   receiving, by the computing device, a user selection of one of the plurality of collapsed middle columns; and
   displaying, by the computing device, the selected middle column in its entire width and further collapsing the remaining middle columns to fit the remaining width of the user interface between the right-most column and the left-most column of the data table.

3. A method as in claim 1, wherein rendering an interactive switch for enabling data table display adjustment on the user interface further comprises:
   determining, by the computing device, a sum of the widths of the plurality of columns exceeds a width of the user interface.

4. A method as in claim 1, wherein the interactive switch is automatically rendered on the user interface upon receiving the user selection of a data file.

5. A method as in claim 1, wherein the interactive switch is rendered outside the data table within the user interface.

6. A method as in claim 1, wherein the interactive switch is a toggle switch.

7. A method as in claim 1, wherein collapsing the plurality of middle columns to fit the remaining available width of the user interface between the right-most column and the left-most column of the data table further comprises:
shifting, by the computing device, the plurality of middle columns toward a center point of the interface.

8. A method as in claim 1, wherein collapsing the plurality of middle columns to fit the remaining available width of the user interface between the right-most column and the left-most column of the data table further comprises:
shifting, by the computing device, the plurality of middle columns towards one of the right-most column or the left-most column.

9. A computer program product for data table display adjustment, the computer program product comprising:
a computer-readable storage medium having program instructions embodied therewith, wherein the computer readable storage medium is not a transitory signal per se, the program instructions comprising:
program instructions to receive, by a computing device, a user selection of a data file for display via a user interface, wherein the data file contains a data table having one or more rows, a left-most column, a right-most column, and a plurality of middle columns with each column having a width;
program instructions to render, by the computing device, an interactive switch for enabling data table display adjustment on the user interface;
program instructions to receive, by the computing device, user input via the interactive switch enabling data table display adjustment; and
program instructions to render, by the computing device, the right-most column and the left-most column of the data table static at outer ends of the user interface and collapse the plurality of middle columns to fit within a remaining available width of the user interface between the right-most column and the left-most column of the data table, wherein collapsing the plurality of middle columns comprises shuffling and shifting the plurality of middle columns such that a portion of each of the plurality of middle columns is hidden by a portion of an adjacent middle column.

10. The computer program product as in claim 9, further comprising:
program instructions to receive, by the computing device, a user selection of one of the plurality of collapsed middle columns; and
program instructions to display, by the computing device, the selected middle column in its entire width and further collapsing the remaining middle columns to fit the remaining width of the user interface between the right-most column and the left-most column of the data table.

11. A computer program product as in claim 9, wherein program instructions to render an interactive switch for enabling data table display adjustment on the user interface further comprises:
program instructions to determine, by the computing device, a sum of the widths of the plurality of columns exceeds a width of the user interface.

12. A computer program product as in claim 9, wherein the interactive switch is automatically rendered on the user interface upon receiving the user selection of a data file.

13. A computer program product as in claim 9, wherein the interactive switch is rendered outside the data table within the user interface.

14. A computer program product as in claim 1, wherein the interactive switch is a toggle switch.

15. A computer program product as in claim 9, wherein the program instructions to collapse the plurality of middle columns to fit the remaining available width of the user interface between the right-most column and the left-most column of the data table further comprises:
program instructions to shift, by the computing device, the plurality of middle columns toward a center point of the interface.

16. A computer program product as in claim 9, wherein the program instructions to collapse the plurality of middle columns to fit the remaining available width of the user interface between the right-most column and the left-most column of the data table further comprises:
program instructions to shift, by the computing device, the plurality of middle columns towards one of the right-most column or the left-most column.

17. A computer program product as in claim 9, wherein the program instructions to collapse the plurality of middle columns to fit the remaining available width of the user interface between the right-most column and the left-most column of the data table further comprises:
program instructions to hide, by the computing device, a portion of each of the plurality of middle columns by a portion of an adjacent middle column.

18. A computer system for data table display adjustment, the system comprising:
one or more computer processors, one or more computer-readable storage media, and program instructions stored on one or more of the computer-readable storage media for execution by at least one of the one or more processors, the program instructions comprising:
program instructions to receive, by a computing device, a user selection of a data file for display via a user interface, wherein the data file contains a data table having one or more rows, a left-most column, a right-most column, and a plurality of middle columns with each column having a width;
program instructions to render, by the computing device, an interactive switch for enabling data table display adjustment on the user interface;
program instructions to receive, by the computing device, user input via the interactive switch enabling data table display adjustment; and
program instructions to render, by the computing device, the right-most column and the left-most column of the data table static at outer ends of the user interface and collapsing the plurality of middle columns to fit within a remaining available width of the user interface between the right-most column and the left-most column of the data table, wherein collapsing the plurality of middle columns comprises shuffling and shifting the plurality of middle columns such that a portion of each of the plurality of middle columns is hidden by a portion of an adjacent middle column.

19. The computer system as in claim 18, further comprising:

program instructions to receive, by the computing device, a user selection of one of the plurality of collapsed middle columns; and program instructions to display, by the computing device, the selected middle column in its entire width and further collapsing the remaining middle columns to fit the remaining width of the user interface between the right-most column and the left-most column of the data table.

* * * * *